April 20, 1937.    R. R. STEVENS    2,077,906
CYLINDER PACKING RING
Filed Aug. 9, 1934

INVENTOR
ROY R. STEVENS,
BY *Wm. N. Bady*
ATTORNEY

Patented Apr. 20, 1937

2,077,906

UNITED STATES PATENT OFFICE 2,077,906

CYLINDER PACKING RING

Roy R. Stevens, Forest Hills, Pa., assignor to The Westinghouse Air Brake Company, Wilmerding, Pa., a corporation of Pennsylvania Application August 9, 1934, Serial No. 739,082

3 Claims. (Cl. 309—33)

This invention relates to piston packing and more particularly to piston packing of the cup type for use in vacuum cylinder devices employed in automotive vehicles for controlling the brakes or clutches thereof.

When such a cylinder device is employed on a vehicle it is usually positioned near the combustion engine and is therefore subjected to considerable heat. The packing usually employed is made of a rubber composition and it has been found that the heat transferred from the engine to the packing together with the action of the lubricating oil used to lubricate the cylinder wall and skirt of the packing causes the packing to expand to such an extent as to bind in the cylinder, which is of course very objectionable.

The principal object of the invention is to provide an improved piston packing having means whereby the above mentioned difficulty is eliminated.

This object is attained by providing the packing with annular expansion absorbing or take-up corrugations which are located inside of and preferably adjacent the peripheral skirt of the packing, said corrugations being adapted to flex transversely to accommodate any expansion of the packing in the direction of its skirt and thereby prevent any undue pressure on the skirt of the packing.

Another object of the invention is to provide a piston packing having means for securing an oiling wick or the like to the packing without the use of any securing means separate from the packing.

Other objects and advantages will appear in the following more detailed description of the invention.

Figure 1:
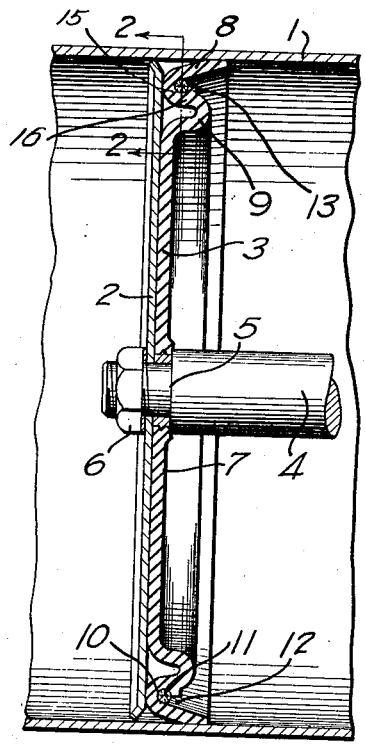
Figure 2:
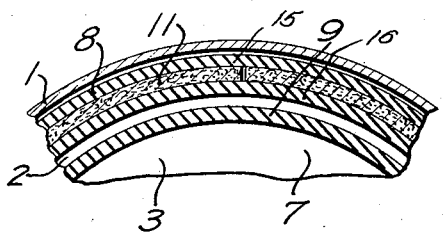

In the accompanying drawing Fig. 1 is a fragmentary longitudinal sectional view through a vacuum cylinder device embodying the invention, and Fig. 2 is a fragmentary cross-sectional view of the same taken on the line 2—2 of Fig. 1.

The cylinder device shown in the drawing is of the vacuum type and comprises a cylinder 1, a piston follower 2, the improved packing 3 and a piston stem 4, all of which are clamped together through the medium of a shoulder 5 on the piston stem and a nut 6 having screw-threaded connection with the stem, the shoulder engaging the face of the packing and the nut engaging the follower.

The piston packing 3 is preferably made of a rubber composition and is of the cup type having a flat central portion 7 and a peripheral skirt portion 8 which forms the outer wall of a corrugation 15 which skirt portion slidably contacts with the inner surface of the cylinder 1. Between the flat portion 7 and the skirt portion 8, the packing is provided with an annular expansion absorbing corrugation 9 which is concentric and contiguous with the corrugation 15, said corrugations being adapted to flex in directions transversely of their depth upon the expansion of either the flat portion 7 or the skirt portion 8 and thereby prevent the force of the skirt portion against the cylinder wall from being increased due to such expansion, to such an extent as to cause the skirt to bind in the cylinder.

At the juncture of the skirt portion 8 and the wall 16 which is common to the corrugations 9 and 15 and on the face side of the packing an annular recess or groove 10 is provided in which an oiling wick 11 is inserted. From an inspection of Fig. 1 it will be noted that the portion of the groove containing the wick is larger than the portion 12 which leads to the face of the packing. By reason of this the wick when mounted in the groove will be held in place without the use of any separate securing means.

The wick 11 may be saturated with lubricating oil either before or after it is placed in the groove 10. With the oil wick positioned as shown in the drawing, oil therefrom creeps along the skirt 8 to the contacting surfaces of the skirt and cylinder wall.

One wall of the restricted portion 12 of the groove 11 is defined by the end of a short lug 13 which extends outwardly from the wall 16 of the corrugations. This lug besides serving to hold the wick 11 in place also tends to prevent or at least restrain the creepage of oil from the wick toward the central portion of the packing. If the wick 11 is round in cross-section as shown, the packing may be flexed to increase the width of the portion 12 of the recess so as to facilitate the placing of the packing in the larger portion of the groove.

From the foregoing description it will be apparent that by providing the annular expansion absorbing corrugations 9 and 15, the expansion of the packing in directions parallel to the plane of the face thereof cannot cause the force of the skirt 8 to be increased to such an extent as to cause a binding action to be set up between the contacting surfaces of the skirt and piston wall.

While the improved piston packing has hereinbefore been described in connection with vacuum cylinder devices it is to be understood that the invention is not to be limited to such use for it will be readily seen that it may be used in any type of cylinder device where they may be a possibility of the packing expanding.

Having now described my invention, what I claim as new and desire to secure by Letters Patent, is:

1. A circular piston packing comprising a flat central body portion adapted to cover the flat central portion of a piston follower and to be attached to the follower, and two oppositely extending contiguous concentric corrugations formed in the face side of the outer portion of the packing, there being an intermediate corrugation wall common to both corrugations, the outer wall of the outer corrugation forming the skirt of the packing, and an oil wick contained in the end of the outer corrugation, and means integral with the wall which is common to both corrugations adapted to hold said wick place in the outer corrugation.

2. A circular piston packing comprising a flat central body portion adapted to cover the flat central portion of a piston follower and to be attached to the follower, and two oppositely extending contiguous concentric corrugations formed in the face side of the outer portion of the packing, there being an intermediate corrugation wall common to both corrugations, the outer wall of the outer corrugation forming the skirt of the packing, and an oil wick contained in the end of the outer corrugation, and means integral with the wall which is common to both corrugations adapted to hold said wick place in the outer corrugation, said means in its wick holding position being spaced away from the outer wall of the outer corrugation to provide a space to permit oil from said wick to creep along said skirt toward its outer edge.

3. A circular piston packing comprising a flat central body portion adapted to cover the flat central portion of a piston follower and to be attached to the follower, and two oppositely extending contiguous concentric corrugations formed in the face side of the outer portion of the packing, there being an intermediate corrugation wall common to both corrugations, the outer wall of the outer corrugation forming the skirt of the packing, and an oil wick contained in the end of the outer corrugation, and means integral with the wall which is common to both corrugations adapted to hold said wick place in the outer corrugation, and also adapted to restrain creepage of oil from the wick toward the outer end of the inner corrugation.

ROY R. STEVENS.